United States Patent [19]
Clark et al.

[11] Patent Number: 5,835,090
[45] Date of Patent: Nov. 10, 1998

[54] DESKTOP MANAGER FOR GRAPHICAL USER INTERFACE BASED SYSTEM WITH ENHANCED DESKTOP

[75] Inventors: Richard L. Clark; Tom C. Martyn, both of Seattle, Wash.

[73] Assignee: ETMA, Inc., Redmond, Wash.

[21] Appl. No.: 733,224

[22] Filed: Oct. 17, 1996

Related U.S. Application Data

[63] Continuation-in-part of Ser. No. 732,179, Oct. 16, 1996, abandoned.

[51] Int. Cl.$^6$ ........................................................ G06F 3/14
[52] U.S. Cl. ............................................ 345/339; 345/342
[58] Field of Search ................................. 345/339, 340, 345/342, 343, 346, 348, 356, 326, 332, 335, 145; 395/683

[56] References Cited

U.S. PATENT DOCUMENTS

| | | | |
|---|---|---|---|
| 5,459,825 | 10/1995 | Anderson et al. | 345/433 |
| 5,499,334 | 3/1996 | Staab | 345/340 |
| 5,572,649 | 11/1996 | Elliott et al. | 345/340 |
| 5,577,187 | 11/1996 | Mariani | 345/342 |
| 5,642,490 | 6/1997 | Morgan et al. | 345/342 |
| 5,657,463 | 8/1997 | Bingham | 345/342 |
| 5,668,997 | 9/1997 | Lynch-Freshner et al. | 395/683 |
| 5,694,150 | 12/1997 | Sigona et al. | 345/145 |
| 5,694,561 | 12/1997 | Malamud et al. | 345/346 |
| 5,699,535 | 12/1997 | Amro | 345/127 |
| 5,748,189 | 5/1998 | Trueblood | 345/331 |
| 6,664,002 | 10/1996 | Brown | 345/326 |

OTHER PUBLICATIONS

Thom Hogan, The Programmer's PC Sourcebook, pp. 261–270, 353–360, and 423–430 Microsoft Press, 1988.

*Primary Examiner*—Matthew M. Kim
*Assistant Examiner*—Crescelle N. dela Torre
*Attorney, Agent, or Firm*—Stoel Rives LLP

[57] ABSTRACT

A desktop manager application (20) manages graphical object creation, repositioning, resizing and related object placement functions in the context of a multi-monitor or other enhanced desktop environment. In a preferred implementation, the program manager (20) manages multi-pass window creation by allowing a graphical user interface operating system (16) to fill in a window structure in a hidden form and thereafter analyzing the window's coordinates relative to selected display criteria such as avoiding monitor splits. Based on this analysis, the program manager (20) selectively repositions the window under consideration in accordance with the display criteria. The program manager (20) thus provides a more user friendly interface between a GUI operating system (16) and applications in the enhanced desktop environment.

14 Claims, 7 Drawing Sheets

DESKTOP MANAGER FOR GRAPHICAL USER INTERFACE BASED SYSTEM WITH ENHANCED DESKTOP

This application is a continuation-in-part of application Ser. No. 08/732,179, filed Oct. 16, 1996, now abandoned.

FIELD OF THE INVENTION

The present invention relates generally to computer systems employing a graphical user interface (GUI) operating system and, in particular, to a method for controlling the positioning of objects on the graphical desktop of such a system. The invention is particularly advantageous for use in enhanced desktop systems.

BACKGROUND OF THE INVENTION

A number of manufacturers are now offering GUI operating systems. GUI operating systems employ graphical objects such as icons and windows (applications windows, child or document windows and dialog boxes) to prompt and receive user input. A user typically enters information by positioning a cursor within a designated area of the graphical desktop—e.g., by using a mouse, trackball, finger, stylus, direction keys or the like—to implement the desired function. GUI operating systems have gained widespread acceptance because of their simple, intuitive operation and because they allow for easy movement between multiple applications programs.

Increasingly, consumers are demanding operating systems with an enhanced desktop, i.e., an operating system working area larger than the display area of a single monitor. The enhanced desktop can be implemented by utilizing multiple monitors or by employing a virtual desktop area where the display area of a single monitor can be "scrolled" across a larger graphical desktop. Such enhanced desktop systems achieve greater display capability without the expense or inconvenience of a single, larger monitor. Users have demanded enhanced desktop systems in hope that they would be able to more fully exploit the abilities of improved processors and the multitasking efficiency of new operating systems. Additionally, enhanced desktop systems allow for improved display area as desired by certain professionals such as CAD and video editing professionals, financial professionals and professionals in the controls market where multiple system components and parameters may have to be simultaneously monitored.

Unfortunately, conventional GUI operating systems are not specifically adapted for enhanced desktop operation. In fact, some newer GUI operating systems are designed to be highly hardware independent for increased compatibility. For example, such systems typically receive a drawing request from an application and translate the drawing request into standard drawing demands. The drawing demands are then passed directly to a graphics board device driver for execution. The driver translates the drawing commands into instructions for driving a graphics chip associated with a monitor. Some graphics drivers can drive multiple chips associated with multiple monitors. However, such multiple monitor drivers generally operate by simply mapping various areas of the operating desktop to particular monitors without regard to border effects such as window partition. Some attempts have been made to improve upon this situation by adding functionality intended to cause pop-up windows and dialogue boxes to appear on a single screen, but these systems have not provided fully satisfactory performance for a broad range of applications programs.

SUMMARY OF THE INVENTION

The present invention is directed to a method for use in controlling placement of graphical objects on a GUI operating system desktop, especially in the enhanced desktop environment. The invention allows for better management of graphical objects on an enhanced desktop and reduces or eliminates a variety of user interface problems relating to monitor border effects. These objectives are substantially transparently achieved by operationally interposing a desktop manager application between the operating system and the applications and having this desktop manager monitor (and modify) operating system requests. In this manner, a standard operating system API can be presented to the applications while controlling an enhanced desktop with respect to selected display criteria. The invention, which can be embodied in a software program or object code can operate in conjunction with a variety of operating system functions relating to object creation, movement, resizing and the like.

According to one aspect of the present invention, graphical object creation is controlled in the enhanced desktop environment relative to selected display criteria. For example, graphical object placement can be controlled to avoid monitor border problems or to position objects at user selected locations on the enhanced desktop. In the context of system or application originated graphical objects such as dialog boxes or pop-up windows, it is desirable to control creation of such objects so that they appear within the display area of a single monitor. It will be appreciated, for example, that a dialog box programmed to appear at the center of a desktop may be split in a dual or other multi-monitor system causing the text or other information to be difficult to read. Remedying this problem is complicated by the fact that certain objects of interest associated with certain applications are not drawn in a single pass but, rather, are created in a series of segments or steps. For example, an application may create a window by drawing in series the window frame, part of the body, another part of the body, etc. Similarly, an application may create a window at a first location and immediately move the window to a second location such that the window appears to be created at the second location to a user. These individual drawing operations are separate but require consistent treatment.

The desktop manager of the present invention addresses object creation including such multiple message processes so as to correctly relocate objects as desired on the enhanced desktop. The corresponding method of the present invention includes the steps of monitoring graphical object messages passing in the computer system and altering a selected display parameter of a first message relating to a given object. After the display parameter of the first message has been altered, the desktop manager analyzes the assigned coordinates of the graphical object and selectively changes the coordinates to reposition the object in accordance with selected display criteria.

The method thus operates in at least two successive steps for a single graphical object to alter a first message and then analyze and selectively change the desktop coordinates of the object. This method can be implemented in various ways. In one implementation, the desktop manager is programmed to recognize drawing patterns of multi-pass user interfaces, e.g., repeated sequences for drawing window elements and/or compound draw-and-move window creation. These patterns can be deduced empirically by observing operation of particular application functions. Based on the recognized patterns, such multi-pass processes can be handled in a coordinated way to correctly reposition the object involved. For example, each element of the window can be repositioned (by analyzing and selectively altering a display parameter relating to desktop coordinates) as it is drawn in a manner such that the completed elements form an integrated and correct window.

More preferably, the desktop manager alters a display parameter (e.g., the visible flag) of object messages to prevent display of the object until drawing is completed. In this regard, it has been recognized that the multiple element object creation processes commonly conclude with one of various messages such as a SHOWWINDOW or WINDOWPOSCHANGING message. When a final message is received, the desktop manager then analyzes the object coordinates relative to the selected criteria such as avoiding border errors. If the position of the object is acceptable, the state of the display is changed from invisible to visible and the object is displayed. If the position is not acceptable, the object coordinates are modified in accordance with the selected display criteria. This implementation eliminates the need for pattern recognition and reduces changes to external information. Moreover, the method increases compatibility with existing and new applications programs.

In the context of user originated object creation messages, the desktop manager preferably allows the user to determine whether to employ controls as described above. For example, the user may select a "Single Monitor Windows" function to avoid monitor splits. In such cases, the desktop manager will control user originated window creation messages according to either of the implementations discussed above. It will be appreciated, however, that the user may desire to deactivate the "Single Monitor Windows" function to allow multi-monitor window displays, e.g., display across the entire enhanced desktop. The desktop manager can also be programmed to control placement of secondary objects (i.e., objects created within other objects) such as child or document windows as well as parent or primary objects.

Object relocation can be conducted relative to a variety of display criteria. Procedurally, the desktop manager relocates the object either by deleting the original message(s) and creating a new message with different coordinates for drawing the object or by modifying the parameters of the original message. These new coordinates can be selected to relocate, for example, to a particular monitor of a multi-monitor system, to the closest monitor as determined by which monitor contains the greatest area of the object, to the current position of the cursor or, in the case of a secondary object such as a child window, to the monitor of the closest parent or primary object. In the case of user originated objects, the desktop manager can also implement a storing feature to reopen an object at the same location occupied when the object was previously closed. It will be appreciated that other display criteria can be employed.

According to another aspect of the present invention, graphical object movement is controlled relative to selected display criteria based on user originated messages. The user originated messages are entered, for example, via a cursor device such as a mouse, trackball, finger or stylus, or via a keyboard. In the case of cursor input, the corresponding method of the present invention includes the steps of: monitoring cursor events to identify a first message relating to initiation of object repositioning; identifying the object which is the subject of the first message; tracking subsequent messages associated with the identified object to identify a second message relating to object repositioning; analyzing display coordinates of the object in response to the second message; and selectively relocating the object based on selected display criteria. By way of example, for drag and drop window repositioning, the step of monitoring cursor events may involve intercepting a mouse down message event and determining whether the event occurred when the cursor was positioned on a window title bar, thereby indicating that repositioning has been initiated. Subsequent drawing messages can be tracked while the mouse button is down by using a window hooking (WH) function. For each message or in response to a final message (e.g., a mouse up message), the drawing coordinates for the object can be analyzed relative to selected criteria such as avoiding monitor splits. When relocation is required, new coordinates can be designated relative to the design criteria, for example, to relocate the object on the closest monitor.

It has also been found useful in the enhanced desktop environment to allow for object repositioning based on keyboard input. The corresponding method includes the steps of: assigning an object relocation function to a keyboard input (key stroke or series of strokes); monitoring keyboard events to identify an occurrence of the keyboard input having the assigned function; and, in response to the occurrence of the keyboard event, relocating an object from a first position outside of a display area of a monitor to a second position inside the display area. In this manner, various keyboard inputs can be programmed to function as "hotkeys" for convenient object relocation in the enhanced desktop environment.

The desktop manager of the present invention also includes a convenient graphical interface for repositioning objects relative to the enhanced desktop and for keeping track of object positions. In a multi-monitor system where many applications may be running on the various monitors, it has been found useful for the user to be able to determine from a quick glance at a single monitor where particular applications reside. Moreover, it is desirable to effect movement of an object across monitor borders without undue scrolling or the like. Accordingly, the desktop manager of the present invention implements a "bird's eye view" function by providing a graphical representation of the enhanced desktop within the display area of a single monitor; providing a graphical symbol for each object resident on the enhanced desktop; and positioning each such graphical symbol at a symbol location within the graphical representation of the enhanced desktop that reflects the object location of the corresponding object on the enhanced desktop. The desktop manager further allows for movement of objects relative to the enhanced desktop by moving the symbol relative to the graphical representation, e.g., by dragging and dropping the symbol.

According to a further aspect of the present invention, the desktop manager allows for object resizing or state changes including minimization in the enhanced desktop environment. The corresponding method of the present invention includes the steps of: monitoring object messages to identify a message relating to object minimization; identifying selected positioning criteria relating to object minimization, where the selected criteria allow for minimization positioning independent of default minimization parameters; and selectively repositioning the minimized object in accordance with the selected display criteria. Preferably, the desktop manager allows the user to select the display criteria from various options such as relocating to a particular monitor of a multi-monitor system, relocating to the current cursor position and, in the case of secondary objects, relocating to the closest parent or primary object monitor.

Relatedly, the desktop manager also allows for selective object maximization in a preferred implementation. In this regard, the desktop manager monitors object messages to identify a message relating to maximization; identifies the assigned coordinates of the maximized object based in the identified message; analyzes the coordinates of the maximized object; and selectively repositions the maximized object relative to the selected display criteria. Preferably, the user can select from various maximization options including maximizing to the full desktop; to a single monitor of a multi-monitor system or to the monitor(s) containing the corners of the object.

The desktop manager system of the present invention thus provides a substantially invisible interface between a GUI operating system and applications that allows the potential benefits of enhanced desktop systems to be more fully realized. System or application originated object creation, as well as user originated object creation, is managed with respect to desired display criteria so as to facilely handle a broad range of object creation functions including multi-pass drawing. The desktop manager also provides and manages a range of object repositioning, resizing, tracking and state change functions for increased efficiency in the enhanced desktop environment.

BRIEF DESCRIPTION OF THE DRAWINGS

For a more complete understanding of the present invention and further advantages thereof, reference is now made to the following detailed description taken in conjunction with the drawings, in which.

DETAILED DESCRIPTION OF THE INVENTION

The present invention is directed to managing placement of graphical objects in a computer system including a GUI operating system and is particularly beneficial for systems including an enhanced desktop. In the following description, the invention is set forth in the context of the WINDOWS 95 or WINDOWS NT operating systems marketed by Microsoft Corporation of Redmond, Wash. It will be appreciated, however, that the various operating system attributes employed by the desktop manager of the present invention have counterparts in other GUI operating systems including Win31, Xwindows, System 7, OS/2 and others. by way of example, the operating system messages, windows and message synchronization discussed below are used by all known GUI operating system on the market today in substantially the same way. Particular messages (e.g., SHOWWINDOW, CREATE and MOVEWINDOW) and data parameters (e.g., visibility, screen coordinates, etc.) referenced below are specific to Microsoft Corporation products including WINDOWS NT, 95 and 3.11, but other systems including Xwindows, System 7 and OS/2 have equivalent functions. Similarly, certain Application Programming Interface (API) calls referenced below such as SetWindowsHookEx and GetWindowRect are specific to Windows NT, 95 and 3.11 although other systems including Xwindows, System 7 and OS/2 have equivalent functions. Accordingly, it will be appreciated that the specific implementations of the present invention set forth below are exemplary and the present invention is not limited to the specifically described functions or operating environment.

SYSTEM ARCHITECTURE

Figure 1:
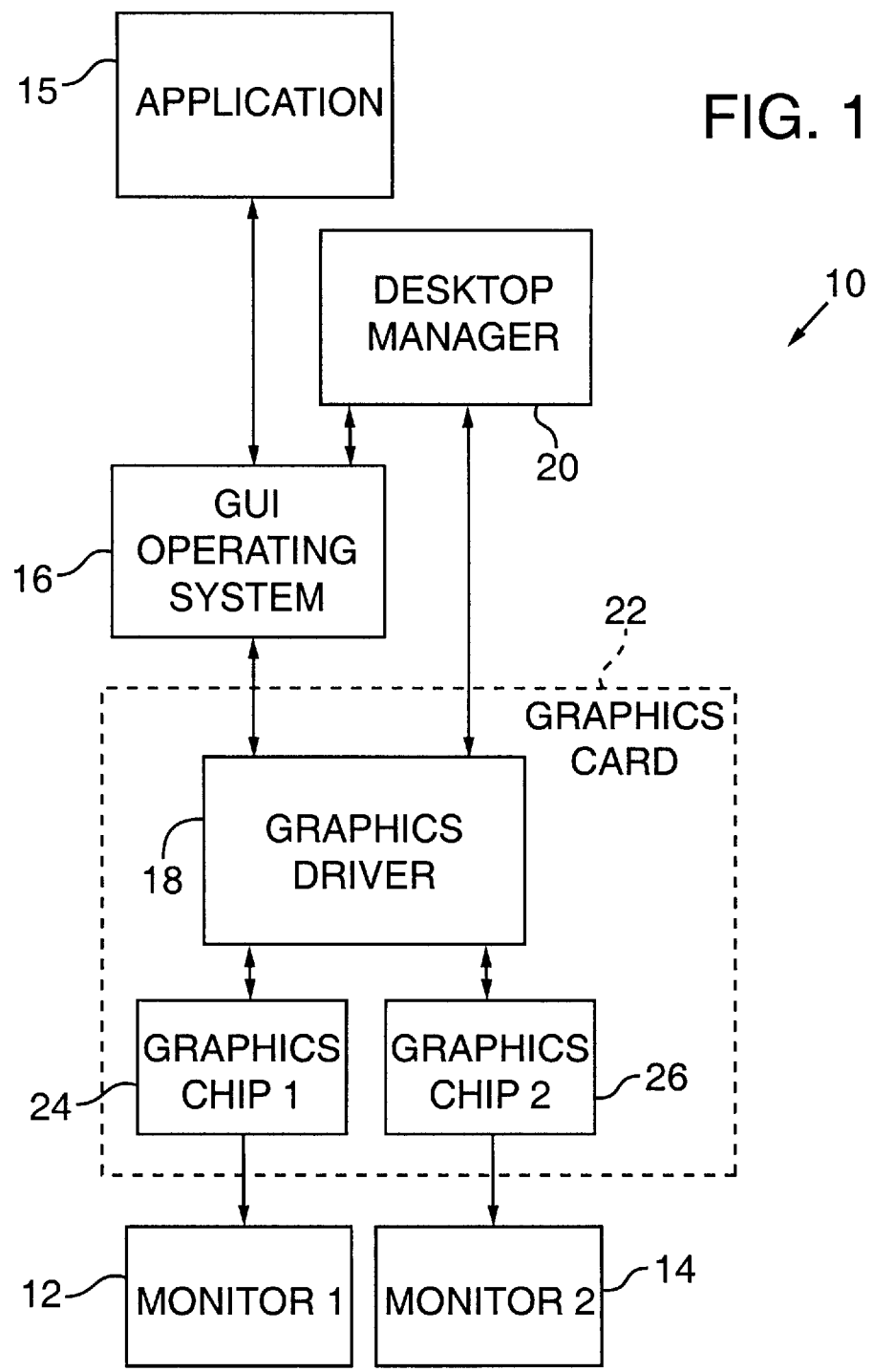
FIG. 1 is a schematic diagram of a multimonitor computer system operated in accordance with the present invention.

FIG. 1 shows a schematic diagram of a multi-monitor computer system 10 in accordance with the present invention. Although more monitors may be employed in accordance with the present invention, the illustrated system 10 includes two monitors 12 and 14. The system further includes: a GUI operating system 16; a graphics driver application 18 and a desktop manager application 20 (which may be combined into a single application) embodied in the computer system 10; and graphics chips 24 and 26 (which may also be embodied in the graphics card(s) 22) for operating the respective monitors 12 and 14. It will be appreciated that the computer system includes additional conventional elements that are not shown such as a central processing unit (CPU), input/output (I/O) busses, static and dynamic memory, etc.

The operating system 16 can be any of various GUI or windows-based operating systems as noted above. For the purposes of the present description, the operating system 16 is taken to be WINDOWS NT or 95 marketed by Microsoft Corporation of Redmond, Wash. Generally, the operating system 16 receives drawing instructions from a compatible applications program and directs the graphics driver 18 to draw on the graphical desktop. WINDOWS NT and 95 separate the applications programs from specific hardware. The operating system 16 can thus interface any WINDOWS compatible applications program with any suitable monitor, provided the monitor is driven by a windows compatible driver. In this regard, graphics drivers conventionally provide information to the operating system regarding the size of the desktop on which the operating system may work. When the operating system receives a drawing request, it translates the request into a standard set of drawing commands based on the desktop size information and passes the commands to the graphics driver for execution. The graphics driver, in turn, translates the commands from the operating system into drawing commands that a graphics chip can recognize.

This independence of the operating system and the display hardware allows for greater hardware compatibility, but does not provide a mechanism whereby the operating system can distinguish between a single, continuous desktop coextensive with the monitor display area (screen) and an enhanced desktop. The illustrated desktop manager 20 is operationally interposed between the operating system 16 and the applications 15 to provide various functions, as set forth in detail below, for managing graphical object display in the enhanced desktop environment. The desktop manager 20 monitors and modifies, as set forth in detail below, messages which pass between the applications and the operating system. The graphics driver 18 presents a standard graphics device driver interface to the operating system 16 while controlling multiple graphics chips 24 and 26 to create a multi-monitor, enhanced desktop. The graphics driver program 18 implements conventional driver functions for translating standard WINDOWS operating system commands into graphics chip commands. It will thus be appreciated that the illustrated desktop manager 20 is fully compatible with WINDOWS NT and 95. Moreover, any compatible graphics chips 24 and 26 can be employed in conjunction with the system 10. The illustrated chips 24 and 26 may be, for example, a GD5434 chip manufactured by Cirrus Logic. Any compatible graphics driver logic may be employed.

In order to implement the full range of functions described below, the desktop manager employs several system-wide windows message hooks. These include WH_GETMESSAGE, WH_CALLMESSAGE, WH_MOUSE, and WH_CBT. These hooks allow desktop manager 20 to monitor and modify windows messages. They provide a filtering function whereby the operating system 16 executes the filter function before processing an event. Hooking applications are well known and the process for installing hooks is set forth in many publications available from Microsoft Press. The hooks employed by the desktop manager 20 monitor messages from all processes/threads associated with the operating system 16 and are therefore preferably located in a dynamic link library.

The discussion below refers to a number of functions performed by the desktop manager 20 relating to graphical object creation, moving, resizing and the like. It will be appreciated that such functions can be implemented in various ways. In this regard, the functions can be compiled and run in computer system 10 as object code (software). In the illustrated embodiment, the desktop manager 20 is embodied in software for installation into computer system 10.

Object Creation

Figure 2:
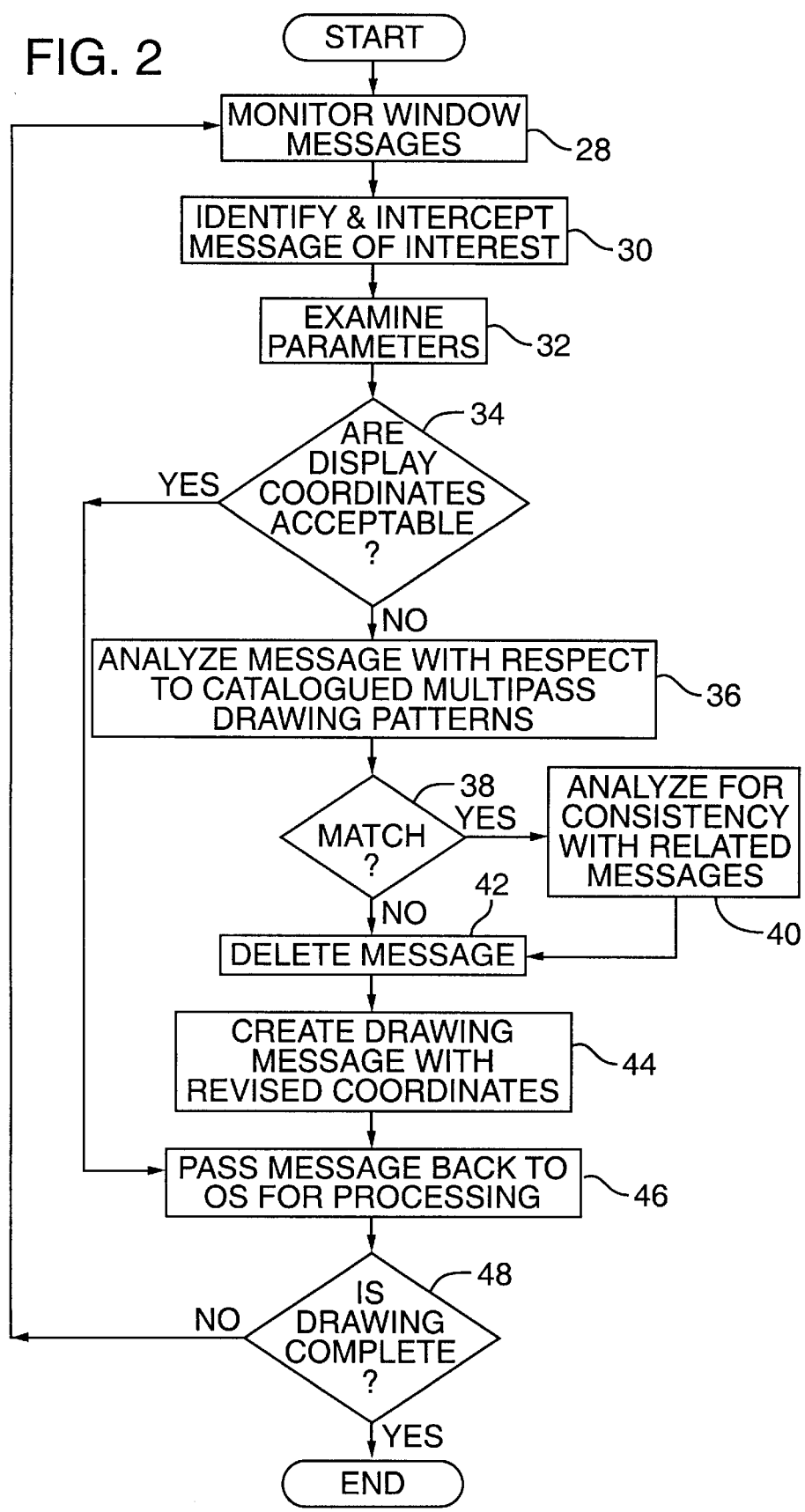
FIG. 2 is a flow diagram illustrating a window creation process implemented by the desktop manager of the present invention.
Figure 3:
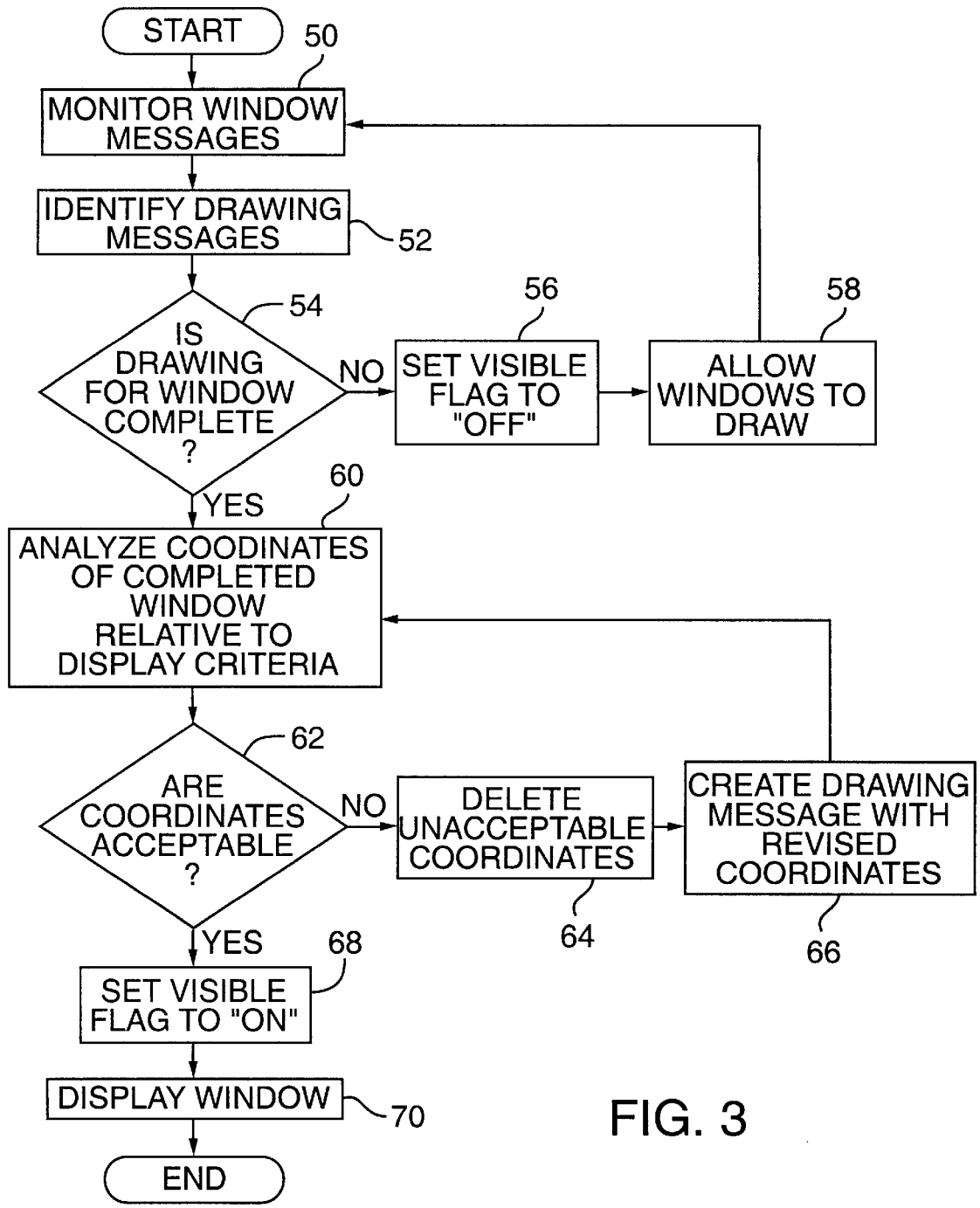
FIG. 3 is a flow diagram illustrating an alternative window creation process implemented by the desktop manager of the present invention.

FIGS. 2–3 illustrate processes for controlling dialogue box or pop-up window creation in accordance with selected display criteria. In particular, the processes of FIGS. 2–3 are capable of handling multi-pass window creation as well as single step window creation, and address the objective of avoiding monitor splits. FIG. 2 involves a drawing pattern recognition approach for consistently handling the various elements of a multi-pass drawing operation. FIG. 3 involves a process of allowing a window to be completed in hidden form and then repositioning the completed window as necessary prior to visible display. Although these processes are set forth with respect to handling application or system originated objects such as dialogue boxes or pop-up windows. Similar processes can be employed with respect to user originated objects.

Referring to FIG. 2, the illustrated process is initiated by monitoring (28) window messages to identify (30) messages of interest. In the WINDOWS operating system protocol, when a window is created, a "CREATE" type message is sent from the operating system to the application represented by the window. The desktop manager intercepts these "CREATE" type messages by calling the SetWindowsHookEx API. This causes the desktop manager to hook all such messages passing in the system. This hooking function allows the messages to be analyzed and modified as necessary prior to execution.

Upon intercepting a message, the message parameters are examined (32) to determine (34) whether the assigned display coordinates are acceptable e.g., whether the subject window or window segment crosses a monitor border. If the assigned coordinates are acceptable, the desktop manager releases the message and the window or segment is displayed (48). If the coordinates are not acceptable, the desktop manager analyzes (36) the message to determine whether the message may be part of a multi-pass drawing operation. It is important that all parts of a multi-pass drawing operation be handled consistently so that the window can be correctly formed. Unfortunately, the patterns of such multi-pass operations are not prescribed by convention and vary from application-to-application as determined by programmers. Consequently, such patterns are deduced empirically for specific applications in the illustrated process. Once a pattern is thus catalogued, it is stored in memory. Individual messages and sequences of messages can then be compared to the stored patterns to determine whether the message matches (38) a catalogued pattern.

When a match is found, the pattern can be used to analyze (40) the message for consistency with related messages in the multi-pass pattern. That is, if a previous related message has been repositioned to particular display coordinates, the subject message can be consistently repositioned. Technically, the window or segment is repositioned by deleting (42) the original message and creating a new message with coordinates selected according to specified display criteria. Such criteria can be selected by the user. The desktop manager of the present invention allows for repositioning in the case of a monitor split to any of at least: a particular monitor selected by the user (e.g., in case of monitor splits, the window will be repositioned to monitor 1), to the closest monitor (determined by which monitor includes the greatest area of the assigned display coordinates), to the current position of the cursor, or, in the case of secondary objects such as child windows, to the monitor where the closest parent application resides. The closest parent application is found by tracing messages back to the parent application. Once the new message has been created, it is released and the window or segment is displayed (46). If the drawing is not complete (48), the desktop manager continues to monitor window messages (28) and the process is repeated.

Referring to FIG. 3, an alternative process for handling window creation operations including multi-pass operations is shown. The process does not rely on pattern recognition and is therefore more broadly applicable. Moreover, as empirical pattern recognition is not required, the process can operate on new applications for which no empirical pattern information is available. Additionally, the code required for implementing the process of FIG. 3 is less cumbersome and can be executed more quickly because comparison to multiple patterns is not required.

The process is initiated by monitoring (50) window messages to identify (52) drawing messages of interest as described above in connection with FIG. 2, i.e., by employing a message hooking function to identify CREATE or SHOWWINDOW messages. Upon identifying a message of interest, the desktop manager first analyzes the message parameters (e.g., WindowStyle) to determine if the parameters are consistent with the type(s) of windows that the manager is programmed to control. The desktop manager of the present invention allows for control of various window types including parent windows and child windows. If the window is of a type managed by the desktop manager, rather than changing the coordinates at each pass of a multi-pass operation, the desktop manager sets (56) a visible flag to "off" and allows (58) the operating system to draw at the assigned coordinates during window creation. This involves clearing a visibility flag included in the windows parameters. The sample code sections set forth in Table 1 illustrate how the desktop manager identifies particular classes of windows to be hooked and gives a window a "hidden" style during drawing:

TABLE 1

```
//*********************************************************************
//
//          PlacementControl:WM_CREATE
//
//*********************************************************************
case WM_CREATE:
{
        LPCREATESTRUCT 1pcs;
        1pcs = (LPCREATESTRUCT) pcwps->1Param;
        if((GetParent(pcwps->hwnd) == NULL)&&
               (ghookInfo.hwndParent == NULL))
        {
               LPCTSTR    string;
               int        i;
               //
               // RELEASE POP-UP WINDOWS
               //
               if(1pcs->style & WS_POPUP)
               {
                       break;
               }
               //
               //RELEASE "PROXY TARGET" WINDOWS WHICH ARE CREATED JUST
//BEFORE "MY COMPUTER" TYPE WINDOWS...
               //
               if((1pcs->cx == 0)&&
                       (1pcs->cy == 0)&&
                       (1pcs->x == 0)&&
                       (1pcs->y == 0)&&
                       (1pcs->style == 0)&&
                       (1pcs->dwExStyle == 0))
               {
                       ghookInfo.hwndParent = NULL;
                       break;
               }
               //
               //GET HANDLE OF PARENT WINDOW THAT'S BEING CREATED
               //
               ghookInfo.hwndParent = pcwps->hwnd;
               //
               //WINDOW POSITION MEMORY INFO
               //
               if(GetClassLong(pcwps->hwnd, GCW_ATOM) != (ULONG)1pcs->1pszClass)
               {
                       //GET THE CLASS NAME OF THE WINDOW THAT IS BEING
// CREATED
                       //
                       string = 1pcs->1pszClass;
                       //
                       //SPECIAL CASES...
                       //
                       if((strcmp(string, "ML_ReadNote") == 0)||
                               (strcmp(string, "ML_SendNote") == 0))
                       {
                               ghookInfo.hwndParent = NULL;
                               break;
                       }
                       for(i=0;i<10;i++)
                       {
                               if(strcmp(string,awpWindowPosition[i].ClassName) == 0)
                               {
                                       //
        //
        //GIVE THE WINDOW A "HIDDEN" STYLE FOR NOW
        //
        1pcs->style |= WS_VISIBLE
        1pcs->style ^ = WS_VISIBLE;
}
if((GetParent(pcwps->hwnd) != NULL)&&
        (1pcs->style & WS_POPUP))
{
        if(!ghookInfo.bDialog)
        {
        //
```

TABLE 1-continued

```
// SAVE HANDLE FOR POPUP WINDOW
//
ghookInfo.hwndPopup = pcwps->hwnd;
if(1pcs->style & WS_DLGFRAME)
{
        ghookInfo.bDialog = TRUE;
}
if(GetClassLong(pcwps->hwnd, GCW_ATOM) != (ULONG)1pcs->1pszClass)
{
        LPCTSTR  string;
        string = 1pcs->1pszClass;
        //
        // THESE WINDOW CLASSES SHOULD NOT BE HOOKED...
        //
        if((strcmp(string, "TipHelp") == 0)||
                (strcmp(string, "MSINToolTip") == 0))
        {
                ghookInfo.hwndPopup = NULL;
                ghookInfo.bDialog = FALSE;
        }
}
if(1pcs->dwExStyle & WS_EX_TOOLWINDOW)
{
        ghookInfo.hwndPopup = NULL;
        ghookInfo.bDialog = FALSE;
```

The window is then "drawn" by the operating system as it normally would but will not be visible in the display area of the monitor due to the clearing of the visible flag. In this regard, each window has a data structure that describes the display parameters of the window including its size, coordinates, etc. The desktop manager allows this structure to be filled in completely, but prevents the window information from being displayed.

The desktop manager continues to monitor window messages to determine (54) when the window is completed. It has been recognized that window creation including multipass creation operations consistently conclude with a SHOWWINDOW or WINDOWPOSCHANGING message. Upon receiving one of these messages, the desktop manager analyzes (60) coordinates of the completed window to determine (62) whether the coordinates are acceptable. This is accomplished by querying the window using the GetWindowRect function which returns the coordinates. This information is compared to previously entered display criteria as described above, e.g., to determine whether the window crosses a monitor border.

If the coordinates are acceptable, the visible flag is reset (68) and the window is displayed (70). The display is initiated using standard procedures by issuing a SHOWWINDOW message. If the coordinates are not acceptable, the desktop manager alters the windows data structure to provide new coordinates, relating to size and position, in accordance with the selected display criteria (e.g., relocate to a particular monitor, to the closed monitor to the cursor, or to the monitor of the closest parent application). This "redrawing" can be implemented by sending a MOVEWINDOW message to the window so as to delete (64) of the unacceptable coordinates and create (66) drawing messages with revised coordinates. It should be noted that the window is still invisible and the operating system may still be drawing at this point. The window is then made visible and displayed as described above.

The code sections set forth in Table 2 illustrate how the desktop manager repositions windows:

TABLE 2

```
//*********************************************************************
//
//     PlacementControl:WM_SHOWWINDOW
//*********************************************************************
//
        case WM_SHOWWINDOW:
showwindow:
        {
                HWND    hwndTemp;
                int                     x, y, width, height;
                RECT    rect;
                ROW_COLUMN      monitorTopLeft;
                POINT           pt;
                if((ghookInfo.hwndPopup == pcwps->hwnd)&&
                        (ghookInfo.bDialog == TRUE))
                {
                        //
                        //GIVE THIS SHOWWINDOW MESSAGE A HIDDEN STYLE
                        //
                        pcwps->wParam = FALSE;
```

TABLE 2-continued

```
                hwndTemp = ghookInfo.hwndPopup;
                ghookInfo.hwndPopup = NULL;
                ghookInfo.bDialog = FALSE;
                GetWindowRect(hwndTemp,&rect);
                x = rect.left;
                y = rect.top;
                width = rect.right - rect.left;
                height = rect.bottom - rect.top;
                if((ghookRegistry.Desktop.positionControl.DialogPositionEnabled)&&
                          (!gSuspendDialog))
                {
                          switch(ghookRegistry.Desktop.positionControl.DialogPosition)
                          {
                                    case CONTROL_DIALOG_POS_PARENT_APP:
                                    {
                                              //
                                              // SHOW DIALOG ON (PARENT) APPLICATION'S
// MONITOR
                                              //
                                              HWND      hwndParentApp;
                                              RECT      ParentRect;
                                              hwndParentApp = GetParent(hwndTemp);
                                              if(      hwndParentApp != NULL)
                                              {
                                              //
                                              //DIALOG MUST HAVE PARENT APPLICATION
                                              //
GetWindowRect(hwndParentApp,&ParentRect);
                                              x = ParentRect.left + (ParentRect.right - ParentRect.left)/2;
                                                        y = ParentRect.top + (ParentRect.bottom -
ParentRect.top)/2;
                                              }
                                              break;
                                    {
                                    case CONTROL_DIALOG_POS_ACTIVE_CURSOR:
                                    {
                                              //
                                              //      SHOW DIALOG ON MONITOR WHERE CURSOR
RESIDES
                                              //
                                              //
                                              //Get Mouse Cursor Position
                                              //
                                              GetCursorPos(&pt);
                                              monitorTopLeft = GetMonitorLocation(pt);
                                              //
                                              //Dialog is outside of cursor's monitor - reposition
                                              //
                                              if(      ((int)(ghookRegistry.Monitor.XResolution *
monitorTopLeft column)>x)||
                                                        ((int)(ghookRegistry.Monitor.XResolution *
(monitorTopLeft column + 1))<(x + width)||
                                                        ((int)(ghookRegistry.Monitor.YResolution *
monitorTopLeft row)>y)||
                                                        ((int)(ghookRegistry.Monitor.YResolution *
(monitorTopLeft row + 1))<(y + height))
                                              {
                                                        x = pt x;
                                                        y = pty;
                                              }
                                              break;
                                    }
                                    case CONTROL_DIALOG_POS_CLOSEST_MONITOR:
                                    {
                                              //
                                              // SHOW DIALOG ON MONITOR CLOSEST TO MIDPOINT OF
DIALOG
                                              //
                                              pt x = rect.left + (rect.right - rect.left)/2;
                                              pty = rect.top + (rect.bottom - rect.top)/2;
                                              monitorTopLeft = GetMonitorLocation(pt);
                                              //
                                              //Dialog is outside of monitor - reposition
                                              //
                                              if(      ((int)(ghookRegistry.Monitor.XResolution *
monitorTopLeft column) > x)||
                                                        ((int)(ghookRegistry.Monitor.XResolution *
(monitorTopLeft column + 1))<(x + width))||
                                                        ((int)(ghookRegistry.Monitor.YResolution *
```

TABLE 2-continued

```
monitorTopLeft row) > y)||
                                            ((int)(ghookRegistry.Monitor.YResolution *
(monitorTopLeft row + 1))<(y + height))
                                            {
                                                x = pt x;
                                                y = pt y;
                                            }
                                            break;
                                    }
                                    default:
                                    {
                                        //
                                        //SHOW DIALOG ON MONITOR #X
                                        //
                                            DWORD monitorIndex;
                                            monitorIndex =
ghookRegistry.Desktop.positionControl.DialogPosition -
CONTROL_DIALOG_POS_MONITOR_NUM;
                                            if(ghookRegistry.Monitor.NRows > 1)
                                            if(ghookRegistry.Monitor.NColumns > 1)
                                            {
                                                //
                                                //SQUARE CONFIGURATION
                                                //
                                                    if(monitorIndex < 2)
                                                    {
                                                        monitorTopLeft column =
monitorIndex;
                                                        monitorTopLeft row = 0;
                                                    }
                                                    else
                                                    {
                                                        monitorTopLeft column =
monitorIndex - 2;
                                                        monitorTopLeft row = 1;
                                                    }
                                            }
                                            else
                                            }
                                                //
                                                //TALL CONFIGURATION
                                                //
                                                    monitorTopLeft column = 0;
                                                    monitorTopLeft row = monitorIndex;
                                                }
                                            }
                                            else
                                            {
                                                //
                                                //WIDE CONFIGURATION
                                                //
                                                    monitorTopLeft column = monitorIndex;
                                                    monitorTopLeft row = 0;
                                            }
                                            x = (ghookRegistry.Monitor.XResolution * monitorTopLeft column)
+
                                                (ghookRegistry.Monitor.XResolution/2);
                                            y = (ghookRegistry.Monitor.YResolution * monitorTopLeft row) +
                                                (ghookRegistry.Monitor.YResolution/2);
                                            break;
                                    }
                            }
                            rect = SingleMonitorDialog(x, y, width, height);
                            x = rect.left;
                            y = rect.top;
                            width = rect.right - rect.left;
                            height = rect.bottom - rect.top;
                    }
                    //
                    //MOVE THE WINDOW TO WHERE WE WANT IT AND MAKE IT VISIBLE
                    //
                    MoveWindow(hwndTemp,
                                x,
                                y,
                                width,
                                height,
                                TRUE);
                    ShowWindow(hwndTemp,
                                SW_SHOW);
```

TABLE 2-continued

```
            UpdateWindow(hwndTemp);
        }
        if(pcwps->hwnd == ghookInfo.hwndParent)
            //
            //GIVE THIS SHOWWINDOW MESSAGE A HIDDEN STYLE
            //
            pcwps->wParam = FALSE;
            hwndTemp = ghookInfo.hwndParent;
            ghookInfo.hwndParent = NULL;
            GetWindowRect(hwndTemp, &rect);
            if(( ghookInfo.bPositionMemory)&&
                (ghookRegistry.Desktop.positionControl.PositionMemory))
                {
            //
            //MOVE THE WINDOW TO WHERE WE WANT IT AND MAKE IT VISIBLE
            //
            MoveWindow(hwndTemp,
                            x,
                            y,
                            width,
                            height,
                            TRUE);
            ShowWindow(hwndTemp,
                            SW_SHOW);
            Update Window(hwndTemp);
        }
        return FALSE;
}
```

Object Repositioning

Figure 4:
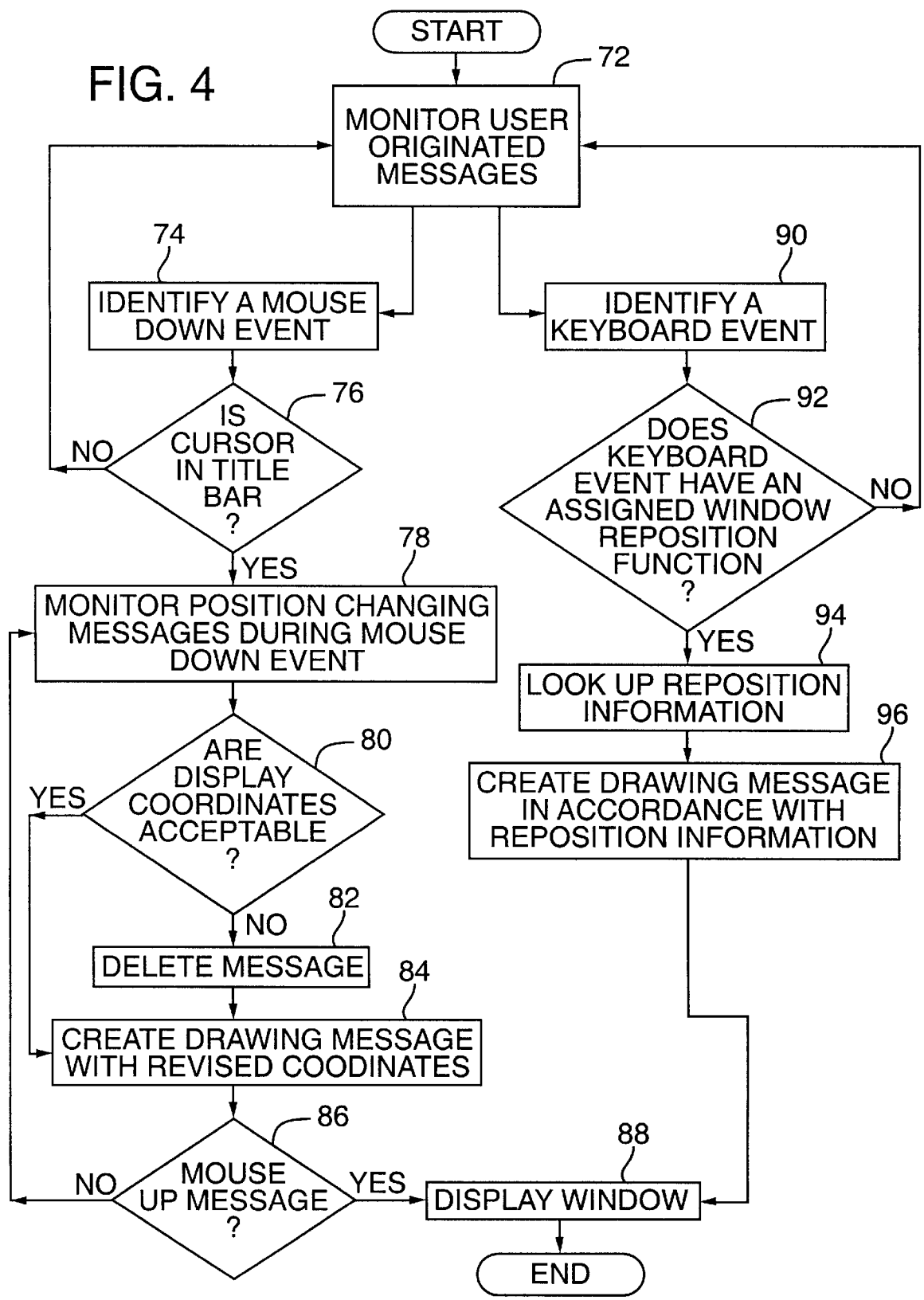
FIG. 4 is a flow diagram illustrating processes for repositioning windows in response to user originated messages as implemented by the desktop manager of the present invention.
Figure 5:
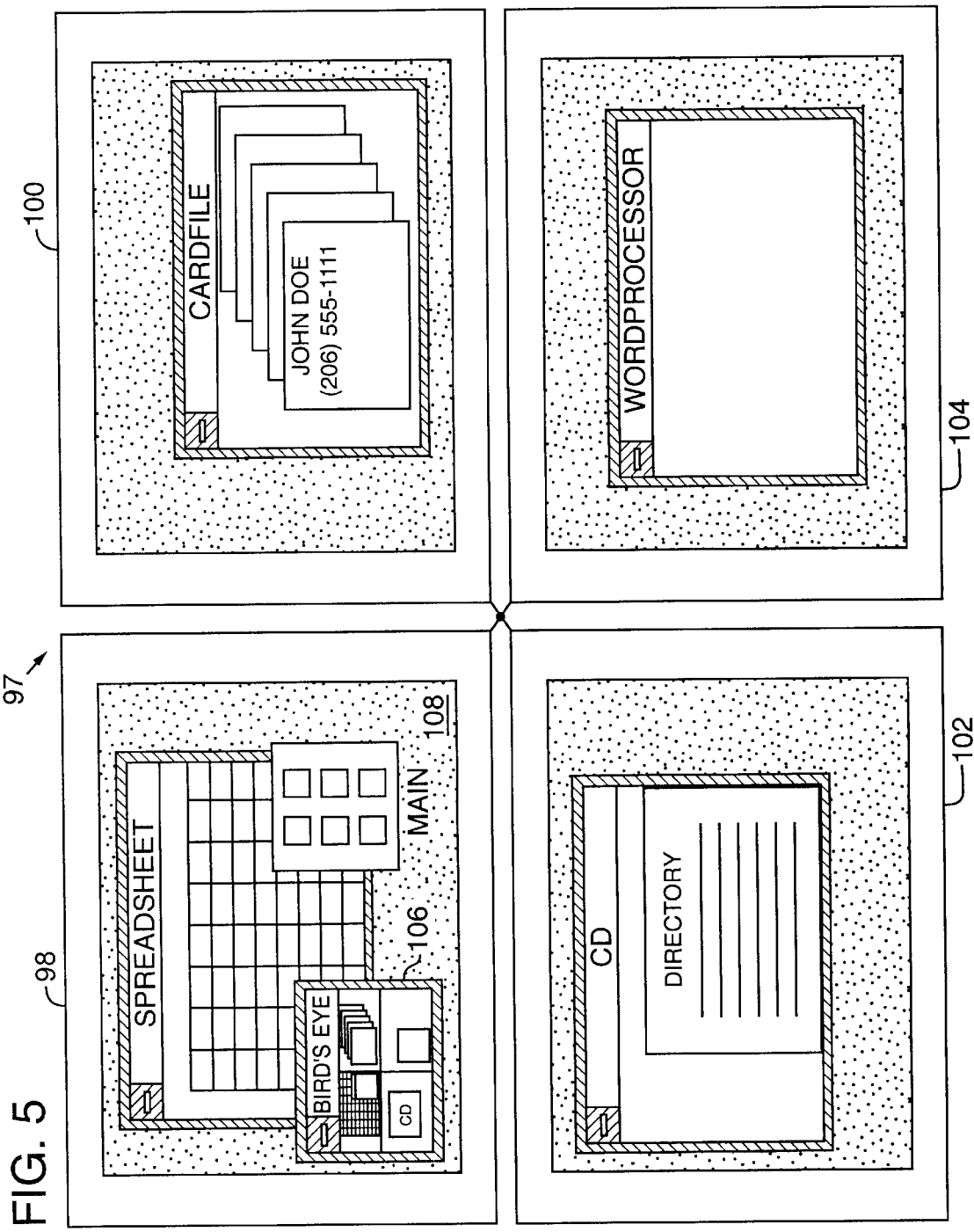
FIG. 5 is a schematic diagram illustrating operation of the bird's-eye view function as implemented by the desktop manager of the present invention.

FIGS. 4–5 illustrate various processes implemented by the desktop manager for repositioning windows in response to user originated messages. Referring to FIG. 4, a process for repositioning windows in response to cursor device events, e.g., mouse events, will first be described. The process is initiated by monitoring (72) user originated messages to identify (74) a mouse down event of interest, e.g., a WM_NCLBUTTONDOWN message in response to depressing a mouse button. Such messages can be monitored by installing an appropriate hooking function. Upon hooking such a message, the "hit test code" of the message is analyzed to determine (76) whether the left move button is down and whether the mouse cursor is located in the title bar of a non-child (primary) window. If so, the desktop manager recognizes that the window is being dragged, records the window's handle and continues to monitor (76) movement of the window. Otherwise, the mouse event is not deemed a dragging event, the associated message is released and the desktop manager continues to monitor (72) user originated messages.

When a dragging event is recognized, the desktop manager monitors all WINDOWPOSCHANGING messages for the window until receiving (86) a WM_LBUTTONUP message indicated that the left mouse button has been released and the dragging operation is complete. The desktop manager analyzes these messages throughout the dragging process to determine (80) whether the window coordinates are acceptable, e.g., to prevent monitor splits. If the WINDOWPOS structure corresponding to any of these messages indicates that the window is being dragged across a monitor border, the desktop manager will revise the window coordinates by deleting (82) the original message and creating (84) a drawing message with revised coordinates as described above. For example, a closest monitor repositioning function may be applied to all such messages during an interval of the dragging operation where the window would be dragged across a border. The result would thus be that the window, as displayed (88), would snap instantaneously across the monitor split.

The sample code sections set forth in Table 3 illustrate how the desktop manager manages drag and drop window moving operations:

TABLE 3

```
            //
            // IF "SINGLE MONITOR WINDOWS" IS SELECTED, DON'T LET THE WINDOW CROSS
MONITOR BOARDERS
            //
            if(ghookRegistry.Desktop.SingleWindow)
            {
                unsigned int    i;
                for(i=1;i<ghookRegistry.Monitor.NColumns; i++)
                {
                    int    boarder;
                    boarder = (ghookRegistry.Monitor.XResolution *i);
                    if(((x + width)>boarder)&&
                                (x < boarder))
                    {
                        if(    ((x + width)-boarder)<(boarder − x))
                        {
                            if(width > (int)ghookRegistry.Monitor.XResolution)
```

TABLE 3-continued

```
                        {
                                width = ghookRegistry.Monitor.XResolution;
                        }
                        x = boarder - width;
                }
                else
                {
                        x = boarder;
                        if(width > (int)ghookRegistry.Monitor.XResolution)
                        {
                                width = ghookRegistry.Monitor.XResolution;
                        }
                }
        }
}
for(i=1;i < ghookRegistry.Monitor.NRows;i++)
{
        int     boarder;
        boarder = (ghookRegistry.Monitor.YResolution *i);
        if(((y + height) > boarder)&&
                (y < boarder))
        {
                if(     ((y + height) - boarder)<(boarder - y))
                        if(height > (int)ghookRegistry.Monitor.YResolution)
                        {
                                height = ghookRegistry.Monitor.YResolution;
                        }
                        y = boarder - height;
                }
                else
                {
                        y = boarder;
                        if(height > (int)ghookRegistry.Monitor.YResolution)
                        {
                                height = ghookRegistry.Monitor.YResolution;
                        }
                }
        }
}
}
```

FIG. 4 also illustrates a process for repositioning windows in response to keyboard events, e.g., key strokes or series of strokes programmed to have a selected window repositioning function ("hot keys"). For example, a particular key can be assigned the function of moving the active window to a particular monitor, e.g. monitor 1. The process is initiated by monitoring (72) user originated messages to identify (90) a keyboard event having an assigned function. Again, this can be implemented using an appropriate hooking function. When the desktop manager determines (92) that the keyboard event has an assigned function, it looks up (94) the associated function parameters (reposition information) and creates (96) a drawing reposition message reflecting the new coordinates specified by the hot key function. This is technically implemented by querying the window to determine what application is active, recording the associated window handle, deleting the keyboard message and issuing a MOVEWINDOW message. The MOVEWINDOW message is then executed and the window is displayed (88) at the coordinates dictated by the hot key function.

FIG. 5 schematically illustrates a bird's eye view function of the desktop manager for indicating the positions of windows or other objects on the desktop. The system 97 of FIG. 5 includes, for example, four monitors 98–104. As shown, each of the monitors 98–104 may have one or more windows currently open and resident in its display area. In the illustrated embodiment, the bird's eye view function of the desktop manager is represented by a window 106 that is contained with the display area 108 of monitor 98. As shown, the window 106 displays a graphical representation of the enhanced desktop which includes the respective display areas of the monitors 98–104. The bird's eye view thus provides a convenient way for the user to recall where various applications are positioned at a glance.

The bird's eye view function also allows for convenient repositioning using a drop and drag procedure. In particular, the user can click on a representation, in the bird's eye view display, of the actual window, drag the representation relative to the bird's eye view display and then release the mouse button. The associated window will be moved in corresponding fashion across the enhanced desktop. This is implemented by monitoring mouse down events using a hooking function to identify events occurring when the mouse cursor is located on a particular window representation within the bird's eye view display. The associated window handle is then recorded and the event is treated as if the actual window was being dragged (see window repositioning discussion above). When the mouse up message (WM_LBUTTONUP) is received or, optionally, continually during the dragging operation, the desktop manager translates the new position of the window representation as the bird's eye view display into a corresponding new window position on the enhanced desktop and issues an appropriate MOVEWINDOW message.

Object Resizing

Figure 6:
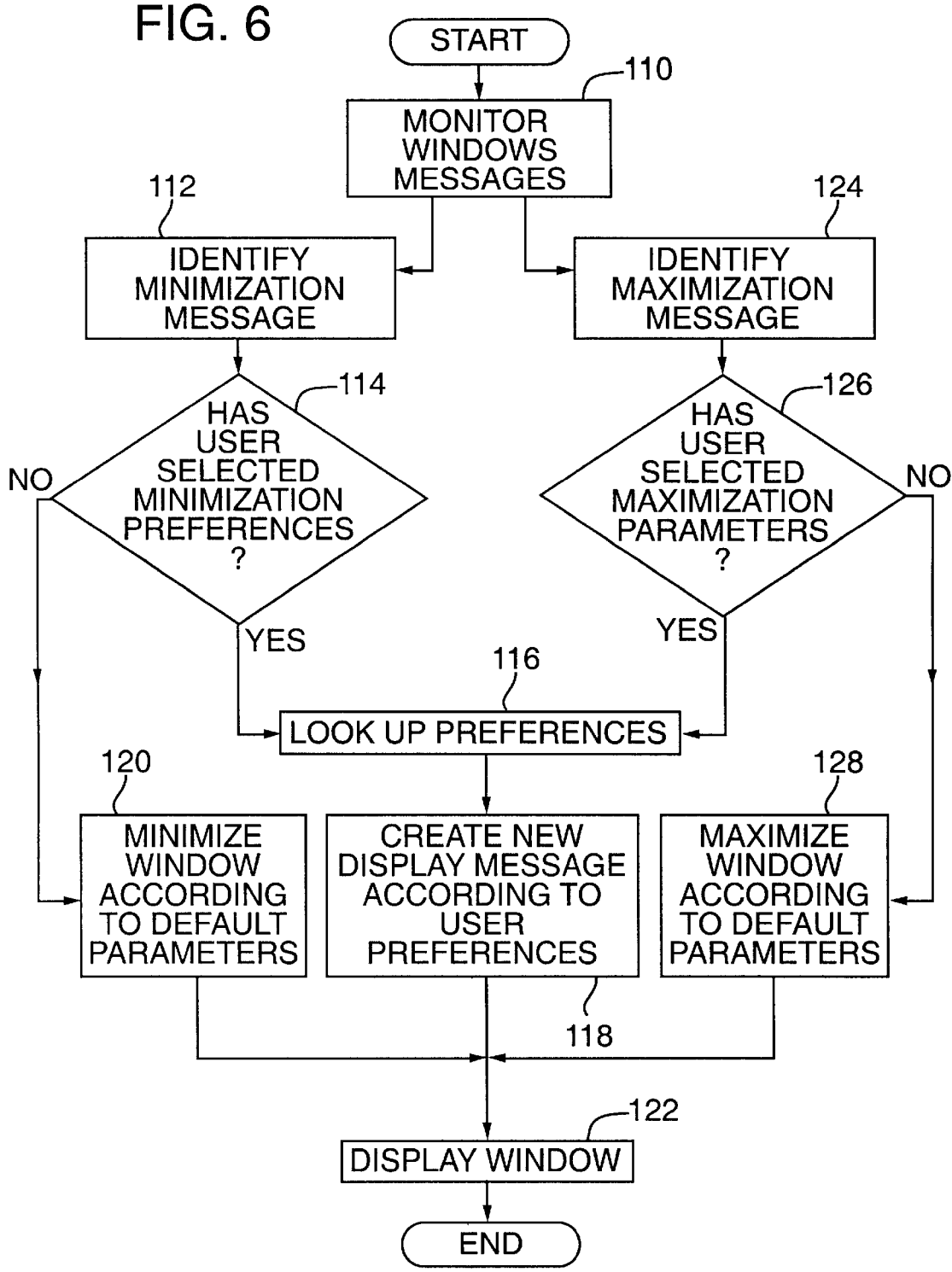
FIG. 6 is a flow diagram illustrating processing of minimization and maximization messages by the desktop manager of the present invention.

FIG. 6 illustrates processes implemented by the desktop manager for minimizing and maximizing windows in the enhanced desktop environment. The minimization process is initiated by monitoring (110) WINDOW MESSAGES to identify (112) a minimization message. Similar to the dialog reposition process discussed above, this is accomplished by using a hooking function SetWindowsHookEx API to catch the windows minimize message. When a minimization message is thus received, the desktop manager determines (114) whether the user has previously selected any minimization preferences. In the enhanced desktop environment, minimization is often problematic in that the resulting minimized window or icon may appear on a different monitor and be difficult to find or inconvenient to access. The desktop manager allows the user to select from various minimization options such as minimizing to a particular monitor, to the closest parent application monitor or to the cursor's monitor. If such preferences have been selected, the desktop manager looks up (116) the preference parameters, creates (118) a new display message reflecting coordinates of the selected preference and the window is displayed (122). Otherwise, the window is minimized (120) as specified by the operating system or application, i.e., according to the default parameters, and the minimized window or icon is displayed (122) normally.

Similarly, the maximization process is initiated by monitoring (110) window messages using a SetWindowsHookEx API as described above. Upon identifying a maximization message, the desktop manager determines (126) whether the user has selected maximization parameters. In this regard, the user may prefer to maximize a window, for example, to the full enhanced desktop, to the full display area of its current monitor, or to the monitor(s) containing the window corners. These preferences can be preselected by the user and stored in memory, or the options can be presented to the user as needed in the form of a pop-up window originated by the desktop manager application. The desktop manager then receives or looks up (116) the maximization preferences, creates (118) a new display message reflecting the coordinates of the preferred maximization parameters and the maximized window is displayed (122). If no preferences are provided by the user, the window is maximized (128) according to default maximization parameters defined by the operating system or application (typically to the full desktop) and the maximized window is displayed (122).

Application Memory

Figure 7:
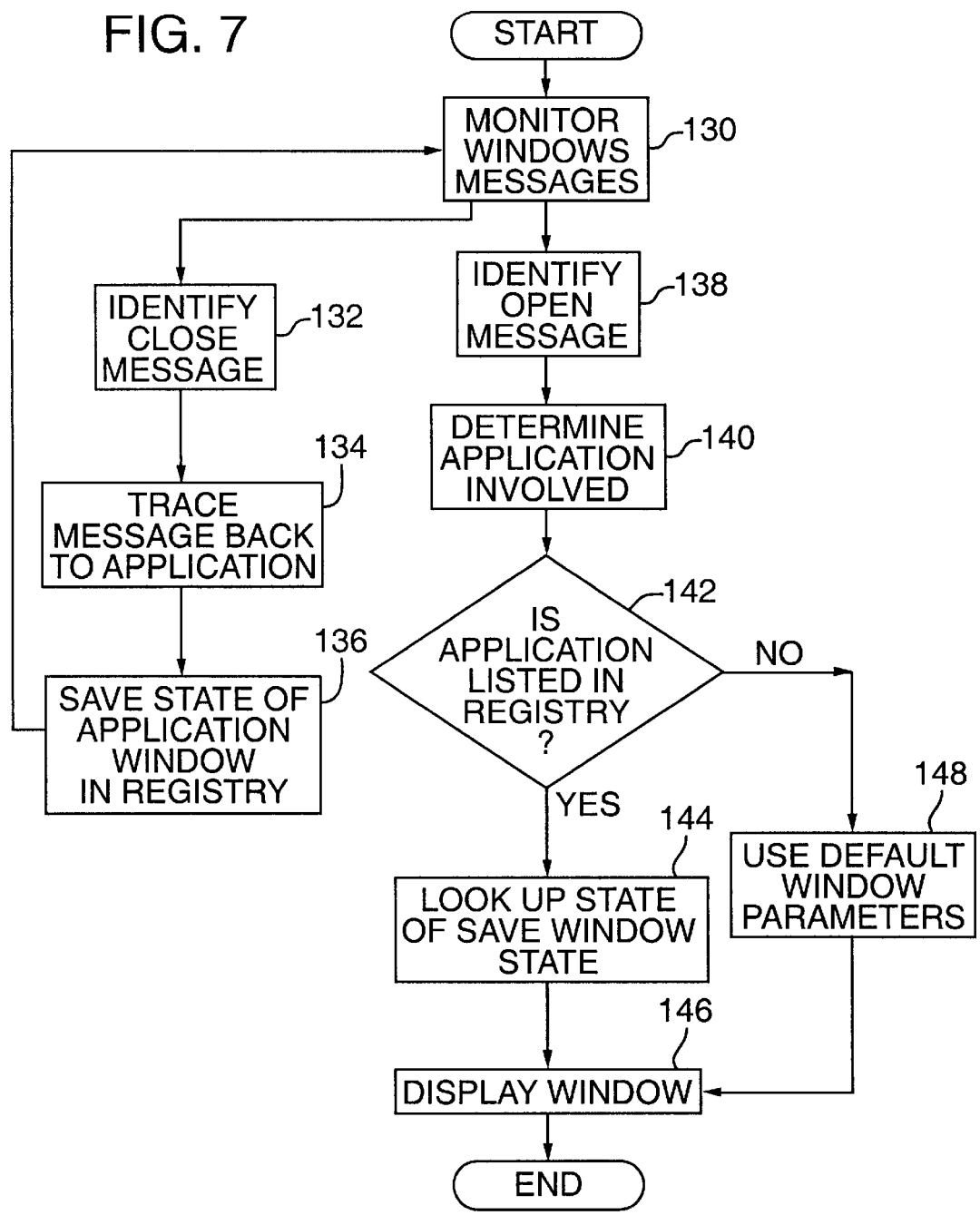
FIG. 7 is a flow diagram illustrating operation of the windows state saving function as implemented by the desktop manager of the present invention.

Referring to FIG. 7, the desktop manager also implements an application memory function that stores window information when an application is closed so that the window can subsequently be opened in the same state, e.g., in the same position and with the same dimensions. The process is initiated by monitoring (130) window messages using an appropriate hooking function to identify (132) a close window message. When a close window message is identified, the desktop manager uses the window handle to trace (134) the message back to its application and saves (136) the current state (size/position) of the window in the registry, where the state information can be indexed to a particular application. The desktop manager then continues to monitor window messages (130) to identify (138) an open window message. Upon identifying such an open window message, the desktop manager determines (140) the identify the application involved, determines (142) whether the application is listed in the registry and, if so, looks up (144) the window state information stored in the register and the window is displayed (146) in the same state as when previously closed. Otherwise, the window message is released by the desktop manager and the default parameters defined by the application are used (148) to display (146) the window.

The code sections set forth in Table 4 illustrate how the desktop manager implements this window saving feature:

TABLE 4

```
// NOTE IF THIS WINDOW HAS A "MEMORIZED POSITION"
//
awpWindowPosition[i].WindowName[0] = '\0';
awpWindowPosition[i].ClassName[0] = '\0';
if( strcmp(string, "CabinetWClass") != 0)
{
        ghookInfo.bPositionMemory = TRUE;
}
ghookInfo.rectPositionMemory = awpWindowPosition[i].WindowRect;
break;
}
         }
    }
            //
            // IF THIS WINDOW HAS A MEMORIZED POSITION, RECALL THE
COORDINATES
            //
            x = ghookInfo.rectPositionMemory.left;
            y = ghookInfo.rectPositionMemory.top;
            width = ghookInfo.rectPositionMemory.right - ghookInfo.rectPositionMemory.left;
            height = ghookInfo.rectPositionMemory.bottom - ghookInfo.rectPositionMemory.top;
            ghookInfo.bPositionMemory = FALSE;
    }
    else
    {
            x = rect.left;
            y = rect.top;
            width = rect.right - rect.left;
            height = rect.bottom - rect.top;
    }
```

The desktop manager of the present invention thus implements a variety of object creation, reposition and resizing, and related placement functions that allow the potential benefits of the enhanced desktop environment to be more fully realized. Moreover, the desktop manager operates quickly and substantially transparently, and handles a broad range of applications and window types.

While various embodiments or implementations of the present invention have been described in detail, it is apparent that further modifications and adaptations of the invention will occur to those skilled in the art. However, it is to be expressly understood that such modifications and adaptations are within the spirit and scope of the present invention.

We claim:

1. A desktop managing method for use in a computer system including at least first and second monitors and a graphical user interface (GUI) operating system, the GUI operating system being operative for use in drawing objects on an enhanced graphical desktop wherein the enhanced graphical desktop has a desktop area that includes a display area of the first and second monitors, said method comprising the steps of:

monitoring graphical object messages passing in said computer system, said graphical object messages including assigned graphical object display parameters for a graphical object including assigned display coordinate information;

altering a selected display parameter of a first graphical object message relating to said graphical object;

separate from said step of altering, conducting an analysis relating to said assigned display coordinate information of said graphical object; and selectively changing said assigned display coordinate information of said graphical object in response to said analysis so as to fully display said object on one of said first and second monitors, wherein said process of altering a display parameter and separately analyzing coordinate information allows for consistent handling of drawing operations.

2. A method as set forth in claim 1, wherein said graphical object is a child window associated with a parent window, wherein said parent window is held on one of said first and second monitors, and said step of selectively changing comprises relocating said graphical object to the monitor holding said parent window.

3. A method as set forth in claim 1, wherein said assigned display coordinate information includes portions of each of said first and second monitors and said step of selectively changing comprises relocating said graphical object to the monitor including the greatest area of said graphical object.

4. A method as set forth in claim 1, further comprising the step of minimizing said graphical object to a selected one of said first and second monitors.

5. A method as set forth in claim 1, further comprising the steps of identifying user originated messages for moving said graphical object relative to said desktop from a starting position to an end position and determining whether said end position extends over a border of said display area between said first and second monitors.

6. A method as set forth in claim 1, wherein said graphical object comprises a child window.

7. A method as set forth in claim 1, wherein said step of altering a selected display parameter comprises giving said graphical object a hidden form.

8. A method as set forth in claim 1, wherein said step of conducting an analysis comprises intercepting a second graphical object message relating to said graphical object, wherein said first and second messages constitute at least a part of a drawing operation and said method further comprises handling said first and second messages in a coordinated fashion so as to consistently treat elements of said drawing operation.

9. A method as set forth in claim 1, wherein said step of monitoring comprises identifying a graphical object completion message relating to displaying said graphical object, wherein said step of conducting an analysis is performed in response to said graphical object completion message.

10. A method as set forth in claim 1, wherein said step of monitoring comprises identifying user originated messages relating to opening said graphical object.

11. A method as set forth in claim 1, wherein said step of monitoring comprises identifying a keyboard input having an assigned object repositioning function and said method further comprises the step of repositioning said graphical object according to said assigned function.

12. A method as set forth in claim 1, further comprising the steps of:

providing a graphical representation of said enhanced desktop within said display area of one of said first and second monitors; and providing a symbol of said graphical object at a symbol location within said graphical representation of said enhanced desktop.

13. A method as set forth in claim 12, further comprising the step of moving said graphical object from one of said first and second monitors to a different one of said first and second monitors by moving said symbol of said graphical object relative to said graphical representation of said enhanced desktop.

14. A method as set forth in claim 1, further comprising the steps of receiving selected resizing coordinate information relating to resizing said graphical object and resizing said graphical object in accordance with said resizing coordinate information.

* * * * *